Patented July 21, 1953

2,646,358

UNITED STATES PATENT OFFICE 2,646,358

COATING FOR FOOD CONTAINERS

Albert C. Edgar, Palos Heights, Ill., assignor to Wilson & Co., Inc., a corporation of Delaware No Drawing. Application April 23, 1947,
Serial No. 743,474

4 Claims. (Cl. 99—187)

This invention relates to methods for preventing the adhesion of meat to the inner surfaces of containers therefor. It also relates to new and useful coating materials for meat cans and to cans coated with such materials.

In the manufacture of canned meats such as luncheon meats, corned beef hash, spiced ham, potted meats, salmon and the like, the cans are filled with the meat, covered, and sealed. The sealed cans are then placed in a steam retort or similar cooker, and cooked, frequently under pressure, for about one to two hours, the amount of pressure and the time of cooking depending on the kind of meat and the size of can used.

A serious problem in the manufacture of canned meats has been the tendency of these products to adhere to the interior surfaces of the cans. This adhesion of meat to the can not only causes difficulty in effecting a complete removal of the contents of the can, but also results in wastage and inconvenience to the consumer who has to scrape off the adhering meat from the sides and bottom of the container. Furthermore, the appearance of the contents is frequently impaired, particularly with products such as luncheon meats which are removed from the can as a rigid cohesive unit, because portions of the adhering surface meat are torn away during removal of the meat from the can.

This tendency of the meat to adhere to the can occurs not only when the inner surfaces of the cans are untreated sheet iron, but also when they have been lacquered, tin-coated, or otherwise treated in accordance with standard procedures.

It has been found, and it is common practice in the industry, that the application of a film of melted lard to the inner surfaces of cans has some beneficial effect in minimizing this adhesive tendency. However, such a treatment is only partially successful and far from satisfactory. The application of a film of gelatin to the inside surfaces of meat cans has also been practiced in the endeavor to prevent adhesion of meat to the sides of the cans, but without real success.

Another means used in the industry in combating this problem is to encase the meat in paper, such as parchment and like papers, before placing the paper-covered meat in the can. Such a treatment is also unsatisfactory because, while there is no adhesion of meat to the walls and bottom of the can, there is considerable adhesion of meat to the paper.

I have discovered that I can eliminate adhesion between the interior surfaces of a can and the surfaces of meat contained therein, by applying to the interior surfaces of the can a thin film of a material selected from the group consisting of rosin, hydrogenated rosin, abietic acid and mixtures thereof.

My invention will be readily understood from the following specific examples. These examples, it will be understood, are illustrative only, and are not to be construed as limiting my invention.

Example 1

Twenty twelve-ounce oblong cans, with tin-coated interior surfaces, of the type used in canning luncheon meat, were divided into two equal groups and marked Lot A and Lot B.

The cans in Lot A were prepared by dusting 0.2 gram of powdered rosin on to the inner surface of each can. The inner surface area of each can was 45 square inches. These cans were then heated with a gas flame until the rosin melted, and then cooled to room temperature.

The cans in Lot B were treated by spraying 0.3 gram of melted lard on to the inner surfaces of each can.

Both lots of cans were then run through a filling machine and filled with pork luncheon meat, sealed, and placed in a steam retort under ten pounds steam pressure for ninety minutes. The cans were then removed from the retort, held in a room at 70° F. for 24 hours and opened.

The meat contained in the cans represented by Lot A came out of the cans easily and left no meat particles adhering to the inner surfaces of the cans.

The contents of the cans in Lot B were removable from the cans only after much shaking, and numerous patches of meat were left adhering to the inside surfaces.

Example 2

Twenty twelve-ounce oblong cans, with tin-coated interior surfaces, of the type used in canning luncheon meat, were divided into two groups and marked Lot C and Lot D.

The cans in Lot C were treated by dusting 0.2 gram of powdered abietic acid onto the inner surface of each can. The inner surface area of each can was 45 square inches. These cans were then heated with a gas flame until the abietic acid became liquid, then cooled to room temperature.

The cans in Lot D were prepared by spraying 0.3 gram of melted lard onto the inner surfaces of each can.

All of the cans were then filled with pork luncheon meat, sealed and heated in a steam retort as in Example 1. On removal from the retort, the cans were stored at 70° F. for ten days. All of the cans were then opened.

The contents of the cans in Lot C were removed by inverting the cans whereupon the meat slid out easily. There were no patches of meat particles left adhering to the inner surfaces of these cans.

In the case of Lot D, the contents of the cans would not come out except after vigorous shaking and there were many large patches of meat particles adhering to the inner surfaces of the cans.

While I prefer to use about 0.2 gram of coating material per about 45-50 square inches of surface, lesser amounts than this will prove beneficial in minimizing adhesion of meat to the said surfaces. Rosin, hydrogenated rosin and abietic acid are effective for this purpose, when only 0.1 gram, or even less, are used per about 45-50 square inches of surface.

It is manifest, from the above examples, that the coating materials of the present invention can be applied to the interior surfaces of the cans in any of several ways, as desired: My invention is not to be construed as limited to the methods of application described in the illustrative examples since other methods may be used, as will be evident to skilled workers in the art. Nor is it intended that it be limited in its application to animal protein matter, since it is readily applicable to marine protein materials, such as fish and fish products as well. Nor is my invention to be construed as limited to the coating of cans or similar containers since paper or similar wrapping materials can be covered with the coating materials of the present invention and the treated paper wrapped around meats prior to being placed in the cans. Furthermore, my invention is applicable to plastic and glass containers as well as those made of metal.

I claim:

1. The process of preventing the adhesion of proteinaceous meaty material to the interior surfaces of a container therefor after the said material has been cooked therein, said method comprising cooking the said meaty material in a container having its interior surfaces covered with an exposed film of a material selected from the group consisting of rosin, hydrogenated rosin, abietic acid and mixtures thereof, while the said meaty material is in contact with said film.

2. The process of preventing the adhesion of proteinaceous meaty material to the interior surfaces of a container therefor after the said material has been cooked therein, said method comprising cooking the said meaty material in a container having its interior surfaces covered with an exposed film of rosin, while the said meaty material is in contact with said rosin film.

3. The process of preventing the adhesion of proteinaceous meaty materials to the interior surfaces of a container therefor, which comprises applying to said surfaces, prior to cooking the proteinaceous meaty materials in said container, a coating of hydrogenated rosin, and cooking the said meaty materials in said container while the same are in contact with said coating.

4. The process of preventing the adhesion of proteinaceous meaty materials to the interior surfaces of a container therefor, which comprises applying to said surfaces, prior to cooking the proteinaceous meaty materials in said container, a coating of abietic acid, and cooking the said meaty materials in said container while the same are in contact with said coating.

ALBERT C. EDGAR.

References Cited in the file of this patent

UNITED STATES PATENTS

| Number | Name | Date |
| --- | --- | --- |
| 1,765,920 | Humpert | June 24, 1930 |
| 1,903,319 | Gray | Apr. 4, 1933 |
| 2,047,957 | Fletcher | July 21, 1936 |
| 2,398,082 | Cavallito | Apr. 9, 1946 |
| 2,443,221 | Bergstein | June 15, 1948 |

OTHER REFERENCES

"Staybelite Resin" (Hercules Hydrogenated Rosin), May 1946, published by the Hercules Powder Company, Naval Stores Department, Wilmington, Delaware, pages 1 to 8, inclusive.